(12) United States Patent
Seong et al.

(10) Patent No.: US 9,396,549 B2
(45) Date of Patent: Jul. 19, 2016

(54) APPARATUS AND METHOD FOR CORRECTING LESION IN IMAGE FRAME

(75) Inventors: Yeong-Kyeong Seong, Suwon-si (KR); Chu-Ho Chang, Yongin-si (KR); Moon-Ho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1082 days.

(21) Appl. No.: 13/438,367

(22) Filed: Apr. 3, 2012

(65) Prior Publication Data
US 2013/0094766 A1 Apr. 18, 2013

(30) Foreign Application Priority Data
Oct. 17, 2011 (KR) .................. 10-2011-0106052

(51) Int. Cl.
G06K 9/00 (2006.01)
G06T 7/00 (2006.01)

(52) U.S. Cl.
CPC ............ *G06T 7/0083* (2013.01); *G06T 7/0012* (2013.01); *G06T 2207/10072* (2013.01); *G06T 2207/30096* (2013.01)

(58) Field of Classification Search
None
See application file for complete search history.

(56) References Cited

U.S. PATENT DOCUMENTS

| | | | |
|---|---|---|---|
| 6,385,332 B1 | 5/2002 | Zahalka et al. | |
| 6,754,374 B1* | 6/2004 | Miller | G06K 9/32 382/128 |
| 7,583,827 B2 | 9/2009 | Hansen et al. | |
| 8,014,576 B2 | 9/2011 | Collins et al. | |
| 8,977,052 B2* | 3/2015 | Chang | G06T 7/0097 382/131 |
| 2002/0106118 A1* | 8/2002 | Ozaki | G06T 7/0083 382/132 |
| 2004/0258285 A1* | 12/2004 | Hansen | G06T 7/0012 382/128 |
| 2005/0027188 A1* | 2/2005 | Metaxas | A61B 5/055 600/410 |
| 2005/0069185 A1 | 3/2005 | Barfuss et al. | |
| 2005/0129297 A1 | 6/2005 | Kamath et al. | |
| 2005/0254720 A1* | 11/2005 | Tan | G06T 7/0067 382/254 |
| 2006/0056692 A1 | 3/2006 | Assmann | |
| 2006/0274928 A1* | 12/2006 | Collins | A61B 6/00 382/132 |
| 2007/0167699 A1* | 7/2007 | Lathuiliere | G06T 7/0089 600/407 |
| 2007/0167760 A1 | 7/2007 | Kim et al. | |

(Continued)

FOREIGN PATENT DOCUMENTS

| | | |
|---|---|---|
| CN | 1589449 A | 3/2005 |
| CN | 101203170 A | 6/2008 |

(Continued)

OTHER PUBLICATIONS

S. Feng et al., "Search for the Best Matching Ultrasound Frame based on Spatial and Temporal Saliencies," *Proceedings of the SPIE, Medical Imaging 2011: Computer-Aided Diagnosis*, vol. 7963, Mar. 4, 2011, pp. 79630N-1 to 79630N-6, conference held Feb. 12-17, 2011, Lake Buena Vista, FL, paper 7963-22 presented on Feb. 16, 2011.

(Continued)

*Primary Examiner* — Aaron W Carter
(74) *Attorney, Agent, or Firm* — NSIP Law

(57) ABSTRACT

An apparatus for extracting a candidate image frame includes a generating unit configured to generate at least one lesion value that represents a characteristic of a lesion included in each of a plurality of 2-dimensional image frames that form a 3-dimensional image, and an extracting unit configured to extract, from the image frames, at least one candidate image frame usable for correcting a boundary of the lesion based on the at least one lesion value.

32 Claims, 12 Drawing Sheets

(56) References Cited

U.S. PATENT DOCUMENTS

| | | | |
|---|---|---|---|
| 2008/0137921 A1* | 6/2008 | Simon | G06T 7/0012 382/128 |
| 2008/0143718 A1* | 6/2008 | Ray | G06K 9/4638 345/424 |
| 2008/0159606 A1 | 7/2008 | Suri et al. | |
| 2008/0281182 A1 | 11/2008 | Rabben et al. | |
| 2008/0292194 A1* | 11/2008 | Schmidt | G06T 7/0012 382/217 |
| 2009/0226060 A1 | 9/2009 | Gering et al. | |
| 2009/0273610 A1* | 11/2009 | Busch | G06T 7/0012 345/619 |
| 2009/0279755 A1* | 11/2009 | Gindele | G06T 7/0081 382/128 |
| 2009/0304231 A1 | 12/2009 | Lu et al. | |
| 2010/0290693 A1 | 11/2010 | Cohen et al. | |
| 2011/0188722 A1* | 8/2011 | Huang | G01R 33/56 382/131 |
| 2012/0063663 A1* | 3/2012 | Kawasaki | G06T 7/0014 382/133 |
| 2012/0253170 A1* | 10/2012 | Kim | A61B 19/50 600/410 |
| 2012/0323072 A1* | 12/2012 | Ishihara | A61B 1/00009 600/109 |
| 2013/0028501 A1* | 1/2013 | Ishihara | A61B 1/00009 382/132 |
| 2013/0094766 A1* | 4/2013 | Seong | G06T 7/0083 382/199 |
| 2013/0114904 A1* | 5/2013 | Chang | G06T 7/0097 382/203 |
| 2014/0037177 A1* | 2/2014 | Endo | G06T 7/0028 382/131 |
| 2014/0085297 A1* | 3/2014 | Kramer | G06T 19/00 345/419 |
| 2014/0213871 A1* | 7/2014 | Watanabe | A61B 5/02042 600/371 |
| 2015/0097868 A1* | 4/2015 | Banerjee | G06F 19/321 345/634 |
| 2015/0146958 A1* | 5/2015 | Chang | G06T 7/0097 382/131 |

FOREIGN PATENT DOCUMENTS

| | | |
|---|---|---|
| JP | 2008-541889 A | 11/2008 |
| JP | 2011-512999 A | 4/2011 |
| KR | 10-2001-0014492 A | 2/2001 |
| KR | 10-2007-0058070 A | 6/2007 |
| WO | WO 2006/128302 A1 | 12/2006 |

OTHER PUBLICATIONS

Extended European Search Report issued on Oct. 31, 2013, in counterpart European Application No. 12188824.2 (6 pages, in English).

Zhang, Q., et al., "Spinal MRI Segmentation Based on Local Neighborhood Information and Gaussian Weighted Chi-Square Distance." Chinese Journal of Biomedical Engineering, vol. 30, No. 3 (Jun. 2011): p. 357-362. (6 pages in Chinese with English abstract).

Chinese Office Action issued on Feb. 3, 2016 in counterpart Chinese Application No. 201210208649.3. (29 pages in Chinese with English translation).

Japanese Office Action mailed on Jan. 26, 2016 in counterpart Japanese Application No. 2012-137421 (16 pages in Japanese with English translation).

* cited by examiner

APPARATUS AND METHOD FOR CORRECTING LESION IN IMAGE FRAME

CROSS-REFERENCE TO RELATED APPLICATIONS

This application claims the benefit under 35 USC 119(a) of Korean Patent Application No. 10-2011-0106052 filed on Oct. 17, 2011, in the Korean Intellectual Property Office, the entire disclosure of which is incorporated herein by reference for all purposes.

BACKGROUND

1. Field

The following description relates to a technology for detecting a lesion from a 3-dimensional image.

2. Description of the Related Art

It is difficult to accurately detect a lesion in an image having noise, a low resolution, and a low contrast. A complex and blurred boundary of a lesion in an image makes it difficult to detect the exact lesion in the image. A detected lesion must be corrected because it is likely to be inaccurate. However, it is difficult to correct a lesion included in a 3-dimensional image because the 3-dimensional image consists of a plurality of 2-dimensional images. Thus, there arises a need of a new technology to easily and accurately correct a lesion included in a 3-dimensional image.

SUMMARY

According to an aspect, an apparatus for selecting a candidate image frame includes a generating unit configured to generate at least one lesion value that represents a characteristic of a lesion included in each of a plurality of 2-dimensional image frames that form a 3-dimensional image; and an extracting unit configured to extract, from the image frames, at least one candidate image frame usable for correcting a boundary of the lesion based on the at least one lesion value.

The extracting unit may be further configured to obtain a lesion value sum by adding the at least one lesion value together to obtain the lesion value sum, or by applying a respective weight to each of the at least one lesion value and adding the weighted at least one lesion value together to obtain the lesion value sum; and extract the at least one candidate image frame from the image frames based on the lesion value sum.

The extracting unit may be further configured to extract the at least one candidate image frame from ones of the image frames that have a local maximum of the lesion value sum.

The extracting unit may be further configured to determine whether the extracted at least one candidate image frame includes all lesions that are included in the image frames; and extract a further candidate image frame from ones of the image frames that include a lesion that is not included in the extracted at least one candidate image frame.

The characteristic of the lesion may include any one or any combination of a number of lesions, a lesion size, a lesion shape, a boundary surface of a lesion, a boundary line of a lesion, and position information of points at a boundary line of a lesion.

According to an aspect, an apparatus for correcting a lesion includes a setting unit configured to set, in response to correction of a lesion included in at least one image frame among a plurality of 2-dimensional image frames that form a 3-dimensional image, the at least one image frame including the corrected lesion as at least one reference image frame; and a correcting unit configured to correct a lesion included in each of the image frames excluding the at least one reference image frame based on the corrected lesion included in the at least one reference image frame, the image frames including the at least reference image frames constituting remaining image frames of the image frames.

The correcting unit may be further configured to perform image segmentation on each of the remaining image frames based on a characteristic of the corrected lesion to correct the lesion included in each of the remaining image frames.

The correcting unit may be further configured to perform image segmentation on a first image frame of the remaining image frames that is adjacent to a reference image frame of the at least one reference image frame based on a characteristic of the corrected lesion in the reference image frame to correct the lesion included in the first image frame; and perform image segmentation on a second image frame of the remaining image frames that is adjacent to the first image frame based on a characteristic of the corrected lesion included in the reference image frame and/or a characteristic of the corrected lesion included in the first image frame to correct the lesion included in the second image frame.

The correcting unit may be further configured to set, if the at least one reference image frame includes at least two reference image frames, at least two sections with respect to the image frames so that each section of the least two sections includes a different reference image frame of the at least two reference image frames and some of the remaining image frames; and correct the lesion included in each image frame of the remaining image frames within each section of the at least two sections based on the reference image frame included in a respective section of the at least two sections.

The correcting unit may be further configured to set the at least two sections not to overlap each other so that none of the remaining image frames are included in more than one section of the at least two sections.

The correcting unit may be further configured to set two sections of the at least two sections to overlap each other so that at least one remaining image frame of the remaining image frames is included in an overlapping section formed by overlapping portions of the two sections; and correct the lesions in each of the at least one remaining image frame within the overlapping section based on the reference image frames included in the two sections.

The apparatus may further include a merging unit configured to merge the corrected lesions included in each of the at least one remaining image frame within the overlapping section on an image frame-by-image frame basis.

According to an aspect, an apparatus for correcting a lesion includes a generating unit configured to generate at least one lesion value that represents a characteristic of a lesion included in each of a plurality of 2-dimensional image frames that form a 3-dimensional image; an extracting unit configured to extract, from the image frames, at least one candidate image frame usable for correcting a boundary of the lesion based on the at least one lesion value; a setting unit configured to set, in response to correction of lesion included in the at least one candidate image frame, the at least one candidate image frame including the corrected lesion as at least one reference image frame; and a correcting unit configured to correct the lesion included in each of the image frames excluding the at least one reference image frame based on the corrected lesion included in the at least one reference image frame, the image frames including the at least one reference image frame constituting remaining image frames of the image frame.

The extracting unit may be further configured to obtain a lesion value sum by adding the at least one lesion value together to obtain the lesion value sum, or by applying a respective weight to each of the at least one lesion value and adding the weighted at least one lesion value together to obtain the lesion value sum; and extract the at least one candidate image frame from the image frames based on the lesion value sum.

The extracting unit may be further configured to determine whether the extracted at least one image frame includes all lesions that are included in the image frames; and extract a further candidate image frame from ones of the image frames that include a lesion that is not included in the extracted at least one candidate image frame.

The correcting unit may be further configured to perform image segmentation on each of the remaining image frames based on a characteristic of the corrected lesion to correct the lesion included in each of the remaining image frames.

The apparatus may further include an examining unit configured to examine whether the image segmentation has been performed normally on each image frame of the remaining image frames; and a re-correcting unit configured to re-correct the lesion included in an image frame of the remaining image frames when the examining unit determines that the image segmentation has not been performed normally on the image frame.

The correcting unit may be further configured to perform image segmentation on a first image frame of the remaining image frames that is adjacent to a reference image frame of the at least one reference image frame based on a characteristic of the corrected lesion in the reference image frame to correct the lesion included in the first image frame; and perform image segmentation on a second image frame of the remaining image frames that is adjacent to the first image frame based on the characteristic of the corrected lesion included in the reference image frame and/or a characteristic of the corrected lesion included in the first image frame to correct the lesion included in the second image frame.

The correcting unit may be further configured to set, if the at least one reference image frame includes at least two reference image frames, at least two sections with respect to the image frames so that each section of the at least two sections includes a different reference image frame of the at least two reference image frames and some of the remaining image frames; and correct the lesions in the remaining image frames within each section of the at least two sections based on the reference image frame included in a respective section of the at least two sections.

According to an aspect, a method of selecting a candidate image frame includes generating at least one lesion value that represents a characteristic of a lesion included in each of a plurality of 2-dimensional image frames that form a 3-dimensional image; and extracting. from the image frames, at least one candidate image frame usable for correcting a boundary of the lesion based on the at least one lesion value.

The extracting of the at least one candidate image frame may include obtaining a lesion value sum by adding the at least one lesion value together to obtain the lesion value sum, or by applying a respective weight to each of the at least one lesion value and adding the weighted at least one lesion value together to obtain the lesion value sum; and extracting the at least one candidate image frame from the image frames based on the lesion value sum.

The extracting of the at least one candidate image frame may further include extracting the at least one candidate image frame from ones of the image frames that have a local maximum of the lesion value sum.

The extracting of the at least one candidate image frame may include determining whether the extracted at least one candidate image frame includes all lesions that are included in the image frames; and extracting a further candidate image frame from ones of the image frames that include a lesion that is not included in the extracted at least one candidate image frame.

The characteristic of the lesion may include any one or any combination of a number of lesions, a lesion size, a lesion shape, a boundary surface of a lesion, a boundary line of a lesion, and position information of points at a boundary line of a lesion.

According to an aspect, a method of correcting a lesion includes setting, in response to correction of a lesion included in at least one image frame among a plurality of 2-dimensional image frames that form a 3-dimensional image, the at least one image frame including the corrected lesion as at least one reference image frame; and correcting a lesion included in each of the image frames excluding the at least one reference image frame based on the corrected lesion included in the at least one reference image frame, the image frames excluding the at least one reference image frame constituting remaining image frames of the image frames.

The correcting of the lesion may include performing image segmentation on each of the remaining image frames based on a characteristic of the corrected lesion to correct the lesion included in each of the remaining image frames.

The correcting of the lesion may include performing image segmentation on a first image frame of the remaining image frames that is adjacent to a reference image frame of the at least one reference image frame based on a characteristic of the corrected lesion in the reference image frame to correct the lesion included in the first image frame; and performing image segmentation on a second image frame of the remaining image frames that is adjacent to the first image frame based on the characteristic of the corrected lesion included in the reference image frame and/or a characteristic of the corrected lesion in the first image frame to correct the lesion included in the second image frame.

The correcting of the lesion may include setting, if the at least one reference image frame includes at least two reference image frames, at least two sections with respect to the image frames so that each section of the at least two sections includes a different reference image frame of the at least two reference image frames and some of the remaining image frames; and correcting the lesion included in each image frame of the remaining image frames within each section of the at least two sections based on the reference image frame included in a respective section of the at least two sections.

The correcting of the lesion may further include setting the at least two sections not to overlap each other so that no remaining image frames of the remaining image frames are included in more than one section of the at least two sections.

The correcting of the lesion may further include setting two sections of the at least two sections to overlap each other so that at least one remaining image frame of the remaining image frames is included in an overlapping section formed by overlapping sections of the two sections; and correcting the lesions in each of the at least one remaining image frame within the overlapping section based on the reference image frames included in the two sections.

The method may further include merging the corrected lesions included in each of the at least one remaining image frame within the overlapping section on an image frame-by-image-frame basis.

According to an aspect, a method of correcting a boundary of a lesion includes generating at least one lesion value that represents a characteristic of a lesion included in each of a plurality of 2-dimensional image frames that form a 3-dimensional image; extracting, from the image frames, at least one candidate image frame usable for correcting a boundary of the lesion based on the at least one lesion value; setting, in response to correction of the lesion included in the at least one candidate image frame, the at least one candidate image frame including the corrected lesion as at least one reference image frame; and correcting the lesion included in each of the image frames excluding the at least one reference image frame based on the corrected lesion included in the at least one reference image frame, the image frames excluding the at least one reference image frame constituting remaining image frames of the image frames.

The extracting of the at least one candidate image frame may include obtaining a lesion value sum by adding the at least one lesion value together to obtain the lesion value sum, or by applying a respective weight to each of the at least one lesion value and adding the weighted at least one lesion value together to obtain the lesion value sum; and extracting the at least one candidate image frame from the image frames based on the lesion value sum.

The extracting of the at least one candidate image frame may include determining whether the extracted at least one image frame includes all lesions that are included in the image frames; and extracting a further candidate image frame from ones of the image frames that include a lesion that is not included in the extracted at least one candidate image frame.

The correcting of the lesion may include performing image segmentation on each of the remaining image frames based on a characteristic of the corrected lesion to correct the lesion included in the remaining image frames.

The method may further include examining whether the image segmentation has been performed normally on each image frame of the remaining image frames; and re-correcting the lesion included in an image frame of the remaining image frames when a result of the examining is that the image segmentation has not been performed normally on the image frame.

The correcting of the lesion may include performing image segmentation on a first image frame of the remaining image frames that is adjacent to a reference image frame of the at least one reference image frame based on a characteristic of the corrected lesion in the reference image frame to correct the lesion included in the first image frame; and performing image segmentation on a second image frame of the remaining images frames that is adjacent to the first image frame based on the characteristic of the corrected lesion included in the reference image frame and/or a characteristic of the corrected lesion included in the first image frame to correct the lesion included in the second image frame.

The correcting of the lesion may include setting, if the at least one reference image frame includes at least two reference image frames, at least two sections with respect to the image frames so that each section of the at least two sections includes a different reference image frame of the at least two reference image frames and some of the remaining image frames; and correcting the lesions in the remaining image frames within each of the at least two sections based on the reference image frame included in a respective section of the at least two sections.

Other features and aspects will be apparent from the following detailed description, the drawings, and the claims.

DETAILED DESCRIPTION

Figure 1:
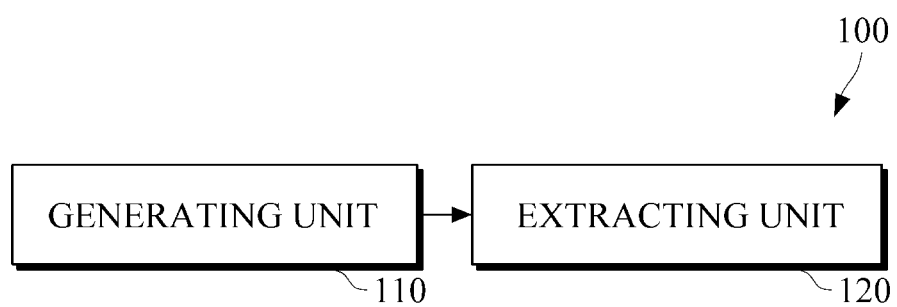
FIG. 1 is a diagram illustrating an example of an apparatus for selecting a candidate image frame.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, the same drawing reference numerals refer to the same elements. The relative size and depiction of these elements may be exaggerated for clarity, illustration, and convenience.

FIG. 1 is a diagram illustrating an example of an apparatus for selecting a candidate image frame. Referring to FIG. 1, an apparatus 100 for selecting a candidate image frame includes a generating unit 110 and an extracting unit 120.

The generating unit 110 detects a lesion from each of a plurality of 2-dimensional image frames that form a 3-dimensional image, and generates at least one lesion value that represents a characteristic of the detected lesion. For example, the generating unit 110 may detect a boundary of the lesion based on a difference in pixel values among the 2-dimensional images, and may determine an interior region within the detected boundary as the lesion. As another example, the generating unit 110 may determine a pixel of a 2-dimensional image as a lesion when a value of the pixel is greater than a reference pixel value. The generating unit 110 may perform the above operation for all of the pixels in each 2-dimensional image frame, thereby detecting a lesion. However, a method the generating unit 110 uses to detect a lesion is not limited to these examples, and various other methods can be used. Characteristics of a lesion may include any one or combination of a number of lesions, a lesion size, a lesion shape, a boundary surface of a lesion, a boundary line of a lesion, and position information about points located on a boundary line of a lesion. However, the characteristics of a lesion are not limited to these examples, and various characteristics can be used.

To detect a lesion, the generating unit 110 may use an automatic lesion detection algorithm, or a user may manually input a lesion location to the generating unit 110.

Automatic lesion detection algorithms are well known in the art, and thus will not be described in detail here for conciseness. Additional examples of a detection algorithm for a 2-dimensional image include a histogram threshold type algorithm, a superpixel type algorithm, and a grid type algorithm, but any other existing 2-dimensional lesion detection algorithm can be used. It is possible to roughly detect a lesion in each of the 2-dimensional images at predetermined intervals, and then further detect the lesion precisely in a range of the 2-dimensional image from which the lesion has been detected. In this case, lesion detection and lesion area extraction can be simultaneously and iteratively performed. After detecting a lesion from some frames, a lesion may be detected from another frame using accurate lesion area information from the previous frames that may be extracted by the generating unit 110.

In a manual lesion location input method, a user views some or all of the 2-dimensional images to identify lesions and manually inputs locations of the lesions to the generating unit 110.

The generating unit 110 represents the characteristics of the detected lesion by numbers to generate lesion values. For example, the number of lesions may be 1, 2, 3, or the like, the lesion size may be represented in units of $mm^2$ or $cm^2$, and a lesion shape may be represented by a number that is determined based on a degree of curvature of a curve of the lesion. For example, the more irregularly curved an outline of a lesion is, the higher a value of the lesion shape may be. The boundary line of a lesion may be represented by a number that indicates a degree of clearness of a boundary line of the lesion. For example, the degree of the clearness of the boundary line of the lesion may be determined based on a brightness gradient that is calculated based on pixel values of a boundary region around the boundary of the lesion. The more unclear a boundary of a lesion is, the higher a value of the boundary line of the lesion may be.

The extracting unit 120 extracts at least one candidate image frame based on the lesion value generated by the generating unit 110. The candidate image frame is a candidate for an image frame that can be used by an adjusting unit shown in FIG. 4) to adjust a lesion.

For example, the extracting unit 120 may simply add lesion values that are generated by the generating unit 110, or may apply respective weights to the lesion values and add the resulting weighted lesion values. For example, if there are lesion values A, B, and C that represent characteristics of a lesion included in one 2-dimensional image frame, the extracting unit 120 may simply add lesion values A, B, and C together to obtain (A+B+C), or may apply respective weights to the lesion values A, B, and C and add the resulting weighted lesion values to obtain ($\alpha*A+\beta*B+\gamma*C$). The weights $\alpha$, $\beta$, and $\gamma$ may be set arbitrarily by a manufacturer or a user.

The extracting unit 120 may extract a candidate image frame from a plurality of 2-dimensional image frames based on the sum of the lesion values or the sum of the weighted image values. Specifically, for example, the extracting unit 120 may extract the candidate image frame from image frames in which the sum of the lesion values or the sum of the weighted lesion values is a local maximum.

The extracting unit 120 may determine whether all lesions included in the 2-dimensional image frames are included in the extracted candidate image frame. If not all lesions are included in the extracted candidate image frame, the extracting unit 120 may extract a further candidate image frame from image frames including a lesion that is not included in the existing candidate image frame.

For example, if there are three lesions in all 2-dimensional image frames, the extracting unit 120 may determine whether all three lesions are included in the candidate image frame or not. If not all three lesions are included in the candidate image frame, the extracting unit 120 may extract a further candidate image frame from image frames each including a lesion that is not found in the existing candidate image frame.

More specifically, if a first lesion and a second lesion are included in the candidate image frame, the extracting unit 120 may further extract an image frame including a third lesion as a new candidate image frame. The first lesion, the second lesion and the third lesion may be the same kind of lesion or may be different kinds of lesions.

The extracting unit 120 may extract a predetermined number of candidate image frames. For example, if a manufacturer or a user previously set three candidate image frames to be extracted, the extracting unit 120 may extract three candidate image frames.

The apparatus for selecting the candidate image frame may extract a candidate image frame to be used for the lesion boundary based on the lesion values in order to accurately correct the boundary of a lesion. Accordingly, a user (for example, a doctor) does not need to correct a lesion included in an arbitrary image frame among a plurality of image frames, but merely needs to correct the lesion included in the candidate image frame extracted by the apparatus. As a result, the apparatus enables correction of a lesion present in other image frames by use of the candidate image frame including the corrected lesion, thereby more accurately correcting the lesion, compared to the case where a lesion present in another image frame is corrected using an image frame arbitrarily selected by the user.

Figure 2:
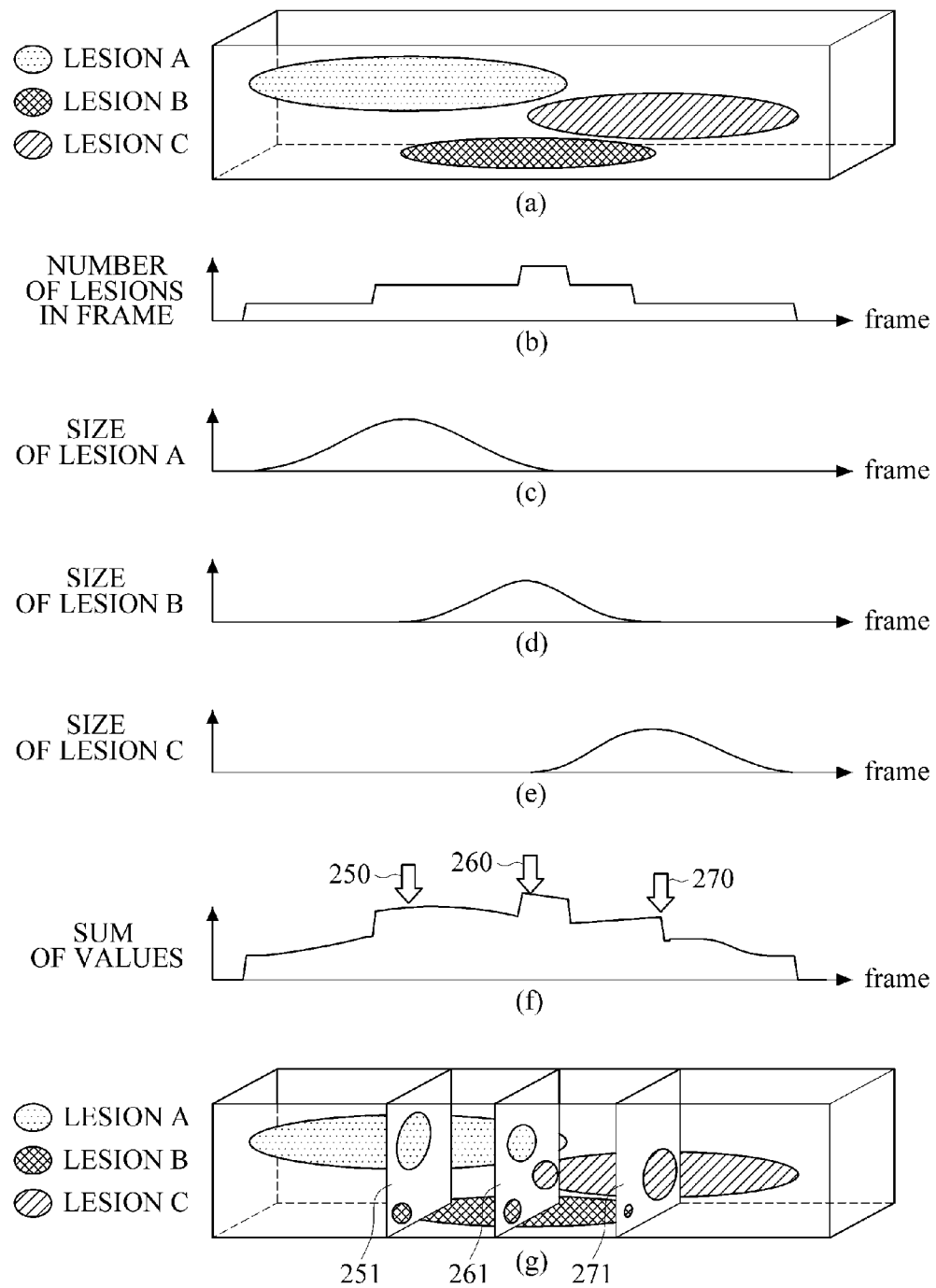
FIG. 2 is a diagram for describing an example of operation of the apparatus illustrated in FIG. 1.

FIG. 2 is a diagram for describing an example of operation of the apparatus illustrated in FIG. 1. This example assumes that there are three lesions and that one image frame among a plurality of image frames includes all three lesions.

Referring to FIG. 1 and (a) of FIG. 2, the apparatus 100 for selecting a candidate image frame generates a lesion value that represents a characteristic of each lesion included in each of a plurality of 2-dimensional image frames that form a 3-dimensional image. This example assumes that the lesion value includes the number of lesions and a lesion size.

In FIG. 2, (b) is a diagram showing the number of lesions in each 2-dimensional image frame, and (c) to (e) are diagrams showing the size of lesions A, B, and C in each 2-dimensional image frame.

The apparatus 100 may simply add the lesion values shown in (b) to (e) of FIG. 2, or may apply a respective weight to the lesion values and add the resulting weighted lesion values. For example, if there are lesion values A, B, and C, the apparatus 100 may add the lesion values A, B, and C unchanged to obtain (A+B+C), or may apply respective weights $\alpha$, $\beta$, and $\gamma$ to the lesion values A, B, and C and add the weighted lesion values to obtain ($\alpha*A+\beta*B+\gamma*C$).

In FIG. 2, (f) is a diagram showing the sum of the lesion values of each 2-dimensional image frame. Referring to (f) in FIG. 2, the apparatus 100 extracts a candidate image frame based on the sum of the lesion values. For example, the apparatus 100 may extract a candidate image frame from image frames respectively having the local maximums 250, 260, and 270 of the sum of the lesion values.

In FIG. 2, (g) is a diagram illustrating image frames having the local maximums. Referring to FIG. (g), for example, the apparatus 100 may determine a candidate image frame by extracting one image frame from the extracted image frames 251, 261, and 271 respectively having the local maximums 250, 260, and 270.

For example, the apparatus 100 may extract a predetermined number of candidate image frames wherein the predetermined number is set by a user. If the user sets the predetermined number of candidate image frames as two, the apparatus 100 extracts two candidate image frames from a plurality of image frames. For example, the apparatus 100 may determine two image frames having the first and the second largest local maximums as the candidate image frames.

As another example, the apparatus 100 may extract a candidate image frame including all lesions that are present in the 2-dimensional image frames. In the example illustrated in (g) of FIG. 2, the apparatus 100 may extract an image frame 261 that includes all three lesions A, B, and C and has the local maximum 260 as a candidate image frame.

The apparatus 100 may stop extracting a candidate image frame when it is determined that all lesions included in all 2-dimensional image frames are present in an extracted candidate image frame.

Referring back to (g) of FIG. 2, the extracted image frame 261 includes all lesions A, B, and C, and thus the apparatus 100 does not further extract a candidate image frame.

The candidate image frame that includes all lesions that are found in all 2-dimensional image frames allows the apparatus 100 to correct a lesion as accurately as possible in any future correction of the lesion.

Figure 3:
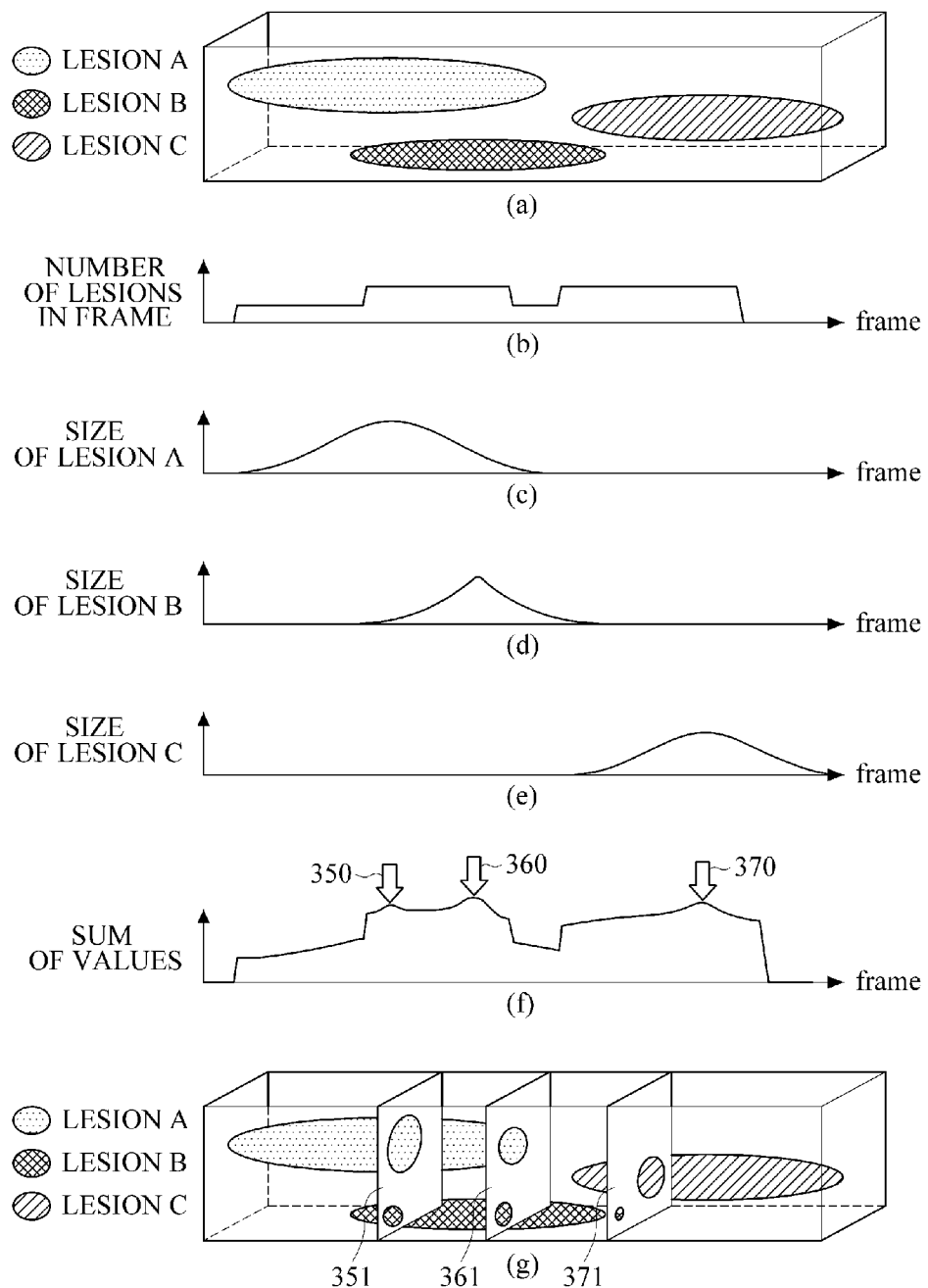
FIG. 3 is a diagram for describing another example of operation of the apparatus illustrated in FIG. 1.

FIG. 3 is a diagram for describing another example of operation of the apparatus illustrated in FIG. 1. This example assumes that there are three lesions and no image frame include all three lesions.

Referring to FIG. 1 and (a) of FIG. 3, the apparatus 100 generates a lesion value that represents a characteristic of a lesion included in each of a plurality of 2-dimensional image frames that form a 3-dimensional image. This example assumes that the lesion value includes the number of lesions and a lesion size.

In FIG. 3, (b) is a diagram showing the number of lesions in each 2-dimensional image frame, and (c) to (e) are diagrams showing the size of lesions A, B, and C in each 2-dimensional image frame.

The apparatus 100 may simply add the lesion values shown in (b) to (e) of FIG. 2, or may apply respective weights to the lesion values and add the resultant weighted lesion values.

In FIG. 3, (f) is a diagram illustrating the sum of the lesion values in each 2-dimensional image frame. Referring to (f) of FIG. 3, the apparatus 100 may extract a candidate image frame based on the sums of the lesion values. For example, the apparatus 100 may extract a candidate image frame from image frames respectively having the local maximum 350, 360, and 370 of the sum of the lesion values.

In FIG. 3, (g) is a diagram illustrating image frames having the local maximums. Referring to (g) of FIG. 3, for example, the apparatus 100 may extract at least one candidate image frame from image frames 351, 361, and 371 respectively having the local maximums 350, 360, and 370.

For example, the apparatus 100 may extract a predetermined number of candidate image frames wherein the predetermined number is set by a user or the like. If the user sets the predetermined number to be two candidate image frames, the apparatus 100 extracts two candidate image frames from a plurality of image frames. For example, the apparatus 100 may extract the image frames having the first and second largest local maximums as the candidate image frames.

In another example, the apparatus 100 may extract candidate image frames that together include all lesions that are present in the 2-dimensional image frames.

Referring back to (g) of FIG. 3, the apparatus 100 extracts the image frame 361 having the largest local maximum 360 as a candidate image frame. The image frame 361 only includes lesion A and lesion B. Therefore, the apparatus 100 may further extract the image frame 371 including lesion B and lesion C and having the local maximum 371 as a candidate image frame. Alternatively, the apparatus 100 may extract an image frame including only lesion C as a further candidate image frame.

The use of lesion values and candidate image frames that together include all lesions present in the 2-dimensional image frames allows the apparatus 100 to correct a lesion as accurately as possible in any future correction of the lesion.

Figure 4:
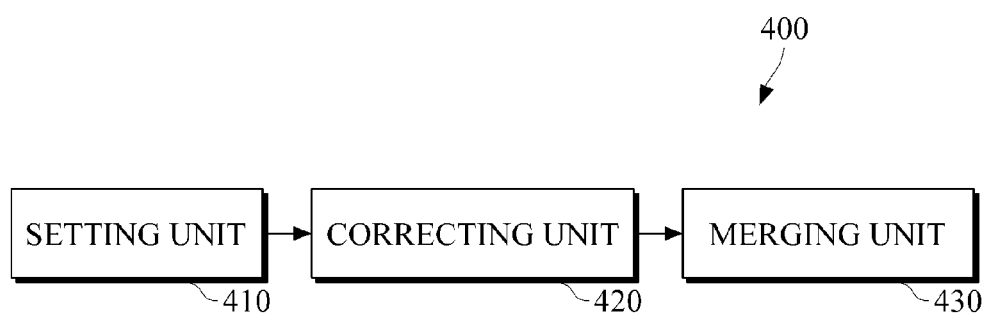
FIG. 4 is a diagram illustrating an example of an apparatus for correcting a lesion.

FIG. 4 is a diagram illustrating an example of an apparatus for correcting a lesion. Referring to FIG. 4, an apparatus 400 for correcting a lesion includes a setting unit 410, a correcting unit 420, and a merging unit 430.

A user may correct a lesion included in at least one image frame among a plurality of 2-dimensional image frames that form a 3-dimensional images. For example, the user may correct a boundary of a lesion included in an image frame, or may designate a new lesion.

In response to the user correcting a lesion included in at least one image frame among a plurality of 2-dimensional image frames that form a 3-dimensional image, the setting unit 410 sets an image frame that includes the corrected lesion as a reference image frame.

The correcting unit 420 corrects the lesion included in the remaining image frames based on the corrected lesion included in the reference image frame. For example, the correcting unit 420 may correct a boundary of the lesion included in the remaining image frames based on the corrected lesion boundary in the reference image frame or may add a new lesion in the remaining image frames based on a the new lesion added to the reference image frame.

The correcting unit 420 performs image segmentation on the remaining image frames based on a characteristic of the corrected lesion, thereby correcting the lesion included in the remaining image frames. For example, the characteristic of the corrected lesion may include information about positions of points on the boundary of the lesion, a difference in position information among image frames, and a lesion shape.

For example, the correcting unit 420 may perform image segmentation on a first image frame adjacent to the reference image frame based on the characteristic of the corrected lesion, thereby correcting the lesion included in the first image frame. Then, the correcting unit 420 may perform image segmentation on a second image frame adjacent to the first image frame based on at least one characteristic of the corrected lesion included in the reference image frame and the first image frame, thereby correcting the lesion included in the second image frame. The correcting unit 420 may perform image segmentation on a third image frame adjacent to the second image frame based on at least one characteristic of the lesion included in the reference image frame, the first image frame and the second image frame, thereby correcting the lesion included in the third image frame.

By repeating the above image segmentation, the correcting unit 420 may correct the lesion included in all of the remaining image frames.

In a case where there are at least two reference image frames, the correcting unit 420 may set at least two sections with respect to the image frames. Each section may include one reference image frame. Based on the reference image frame included in each of the sections, the correction unit 420 may correct the lesion included in the remaining image frames in the corresponding section. For example, if a first reference image frame is included in a first section and a second reference image frame is included in a second section, based on the first reference image frame, the correcting unit 420 may correct the lesion included in the remaining image frames in the first section. In addition, based on the second reference image frame, the correcting unit 420 may correct the lesion included in the remaining image frames in the second section. The sections may or may not overlap depending on how the sections were set by the correcting unit 420.

The merging unit 430 merges the corrected lesions included in the image frames within overlapping sections on an image-frame-by-image-frame basis. For example, in a case where the first section including the first reference image frame and the second section including the second reference image frame overlap each other, the lesion included in the image frames included in the overlapping sections may be corrected one time based on the first reference image frame, and then corrected another time based on the second reference image frame (thus, a total of two corrections of the lesion). The merging unit 430 merges the image frame including the lesion corrected based on the first reference image frame and the image frame including the lesion corrected based on the second reference image frame into one image frame. The detailed description of the merging will be provided later with reference to FIGS. 6 and 8.

The apparatus 100 may use only some image frames (reference image frames) including the corrected lesion, among a plurality of the 2-dimensional image frames that form a 3-dimensional image, to accurately and easily correct the lesion included in the remaining image frames.

Figure 5A:
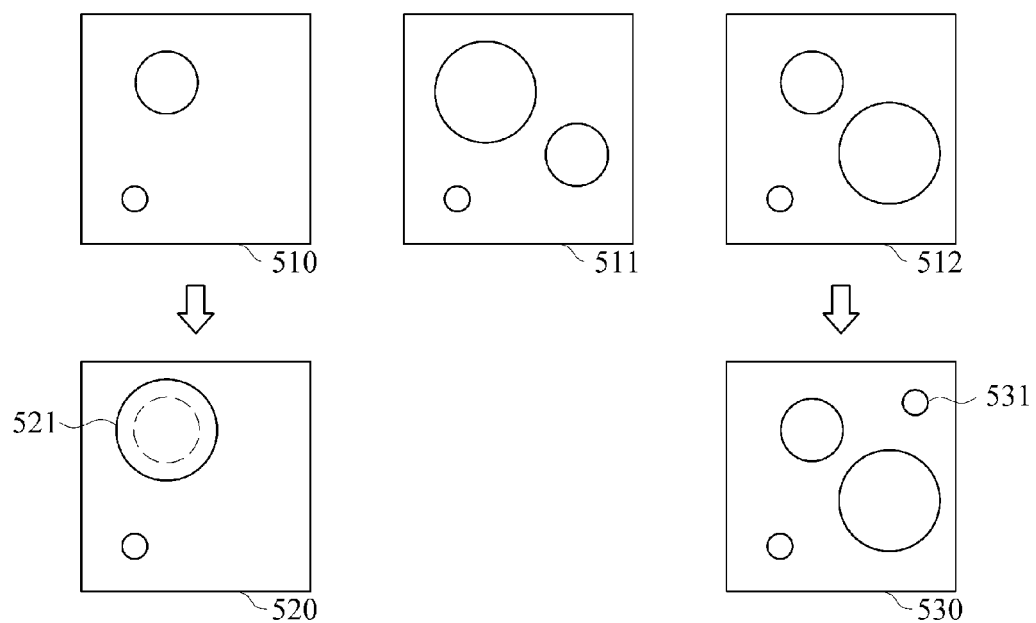
FIGS. 5A and 5B are diagrams for describing procedures of correcting lesions included in an image frame.
Figure 5B:
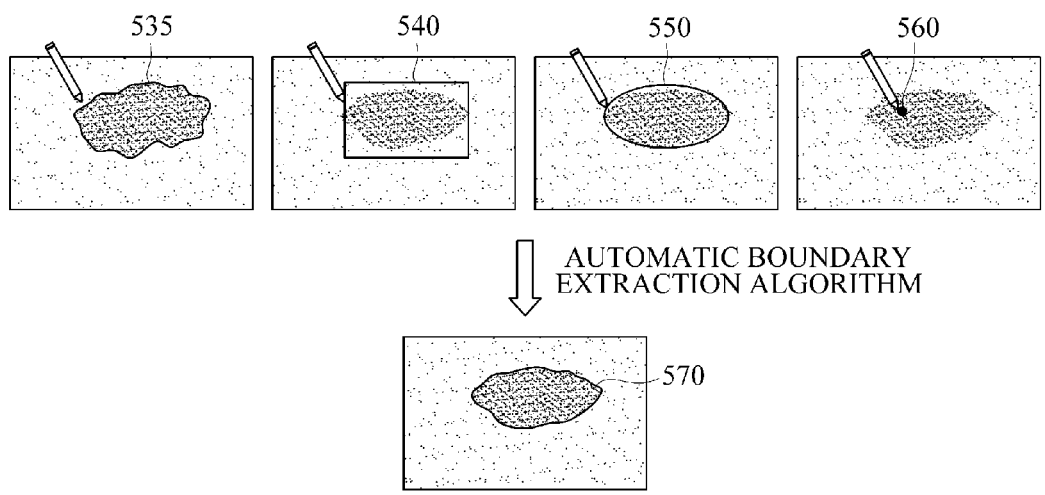

FIGS. 5A and 5B are diagrams for describing procedures of correcting lesions included in an image frame. Referring to FIGS. 4 and 5A, the user may correct a lesion included in at least one image frame among 2-dimensional image frames 510, 511, and 512 that form a 3-dimensional image. For example, the user (for example, a doctor) may correct a boundary of a lesion included in the image frames 510 and 512 or add a new boundary to add a new lesion, thereby generating corrected image frames 520 and 530. The corrected image frame 520 may include a corrected lesion boundary 521 and the corrected image frame 530 may include an added lesion 531. The setting unit 410 may set the corrected image frames 520 and 530 as reference image frames.

Referring to FIGS. 4 and 5B, the user may indicate a region that the user determines includes a lesion by use of various methods to add the lesion to an image frame. For example, the examiner may indicate the region with a free curve 535, a rectangle 540, an oval 550, or a point 560. The apparatus 400 may use a boundary extraction algorithm to extract a boundary 570 of the lesion included in the region indicated by the user. Accordingly, the lesion can be added to the image frame, such as the corrected image frame 530 including the added lesion 531 in FIG. 5A. The setting unit 410 may set the corrected image frames 520 and 530 (refer to FIG. 5A) as reference image frames. Boundary extraction algorithms are well known in the art, and thus will not be described herein.

Figure 6:
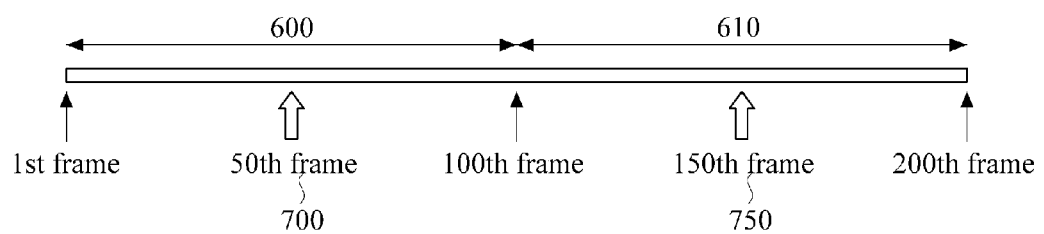
FIG. 6 is a diagram illustrating an example of sections that are set not to overlap by the correcting unit illustrated in FIG. 4.

FIG. 6 is a diagram illustrating an example of sections that are set not to overlap by the correcting unit 420 illustrated in FIG. 4. This assumes that there are 100 image frames including two reference image frames (a first reference image frame and a second reference image frame), but the number of frames and the number of reference image frames is not limited thereto.

Referring to FIGS. 4 and 6, with respect to 200 image frames, the correcting unit 420 sets a first section 600 including a first reference image frame 700 and a second section 610 including a second reference image frame 750 so that the first section 600 and the second section 610 do not overlap each other. As shown in FIG. 6, in a case where the first reference image frame 700 is the 50th image frame and the second reference image frame 750 is the 150th image frame, the correcting unit 420 sets the first section 600 to include the 1st image frame to the 100th image frame, and sets the second section 610 to include the 101st image frame to the 200th image frame. However, this is only an example, and the correcting unit 420 may set the first section 600 and the second section 610 to include ranges of image frames other than those shown in FIG. 6.

Based on the first reference image frame 700 included in the first section 600, the correcting unit 420 corrects the lesion included in the remaining image frames in the first section 600.

Figure 7:
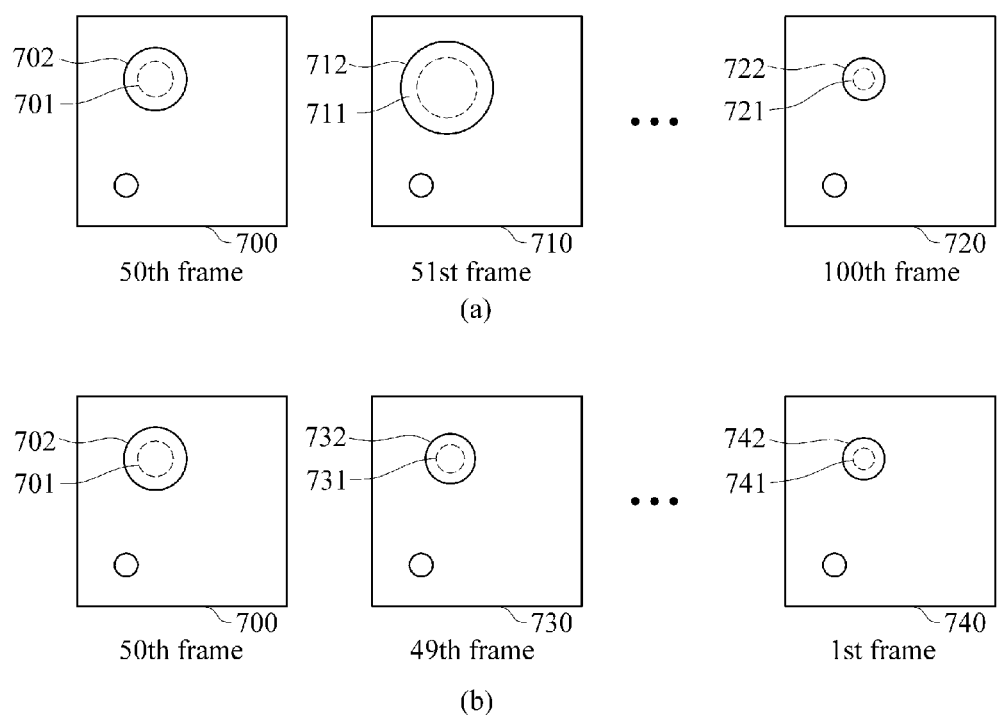
FIG. 7 is a diagram illustrating examples of image frames for describing procedures of a correcting unit correcting the remaining image frames using a reference image frame illustrated in FIG. 6.

FIG. 7 is a diagram illustrating examples of image frames for describing procedures of a correcting unit correcting the remaining image frames using a reference image frame illustrated in FIG. 6. Referring to FIGS. 4, 6, and 7, these examples assume that the first reference frame 700 includes a corrected lesion 702, and the size of the corrected lesion 702 is larger than a size of an existing lesion 701.

As shown in (a) of FIG. 7, the correcting unit 420 performs image segmentation on the 51st image frame 710 based on a characteristic of the corrected lesion 702 included in the first reference image frame 700 included in the first section 600, which is the 50th image frame. The 51st image frame 710 is adjacent to the first reference image frame. Thus, an existing lesion 711 included in the 51st image frame 710 is corrected to a corrected lesion 712. By repeating the above operation for each successive image frame, the correcting unit 420 propagates the image segmentation from the 52nd image frame (not shown) to the 100th image frame 720. The correcting unit 420 performs image segmentation on the 100th image frame 720 based on a characteristic of a corrected lesion (not shown) included in the 99th image frame (not shown). Thus, an existing lesion 721 included in the 100th image frame 720 is corrected to a corrected lesion 722. As a result, the lesions included in the 51st image frame 710 to the 100th image frame 720 are corrected. A description of the image segmentation performed by the correcting unit 420 on the 52nd image frame to the 99th image frame is omitted for conciseness of explanation.

Also, as shown in (b) of FIG. 7, the correction unit 420 performs image segmentation on the 49th image frame 730 based on a characteristic of the corrected lesion 702 included in the first reference image frame 700, which is the 50th image frame. The 49th image frame 730 is adjacent to the first reference image frame. Accordingly, an existing lesion 731 included in the 49th image frame 730 is corrected to a corrected lesion 732. By repeating the above operation for each preceding image frame, the correcting unit 420 propagates the image segmentation from the 48th image frame (not shown) to the 1st image frame 740. The correcting unit 420 performs image segmentation on the first image frame 740 based on a characteristic of a corrected lesion (not shown) included in the 2nd image frame (not shown). Thus, an existing lesion 741 included in the 1st image frame 740 is corrected to a corrected lesion 742. As a result, the lesions included in the 49th image frame 730 to the 1st image frame 740 are corrected. A description of the image segmentation performed by the correcting unit 420 on the 48th image frame to the 2nd image frame is omitted for conciseness of explanation.

As described above, the correcting unit 420 corrects lesions in the 1st image frame to the 49th image frame and the 51st image frame to the 100th image frame included in the first section 600 based on the first reference image frame 700 included in the first second 600. In a similar manner, the correcting unit 420 corrects lesions included in the 101st image frame to the 149th image frame and the 151st image frame to the 200th image frame included in the second section 610 based on the second reference image frame 750 included in the second section 610.

Based on at least two reference image frames, the apparatus 400 may correct the lesions included in the remaining image frames other than the at least two reference image frames, and thus can correct the lesions in the remaining image frames more accurately and easily.

Figure 8:
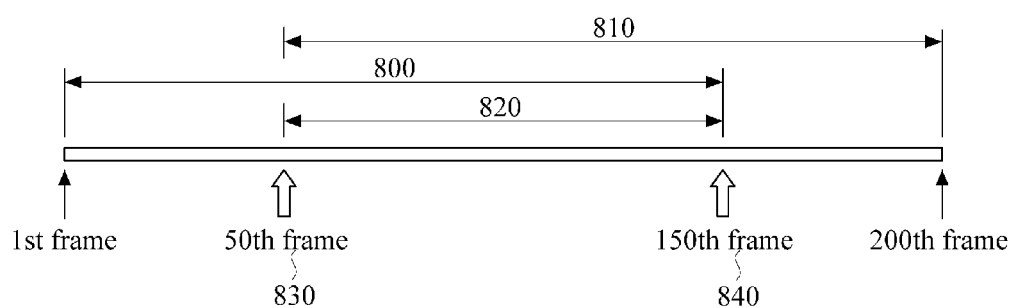
FIG. 8 is a diagram illustrating an example of sections that are set to overlap by the correcting unit illustrated in FIG. 4.

FIG. 8 is a diagram illustrating an example of sections that are set to overlap by the correcting unit 420 illustrated in FIG. 4. Referring to FIG. 8, this example assumes that there are 200 image frames including two reference image frames (a first reference image frame and a second reference image frame), but the number of frames and the number of reference image frames is not limited thereto.

Referring to FIGS. 4 and 8, the correcting unit 420 sets a first section 800 including a first reference image frame 830 and a second section 810 including a second reference image frame 840 so that the first section 800 and the second section 810 overlap each other. As shown in FIG. 8, in a case where the first reference image frame 830 is a 50th image frame and the second reference image frame 840 is a 150th image frame, the correcting unit 420 sets the first section 800 to include the 1st image frame to the 149th image frames, and the second section 810 to include the 51st image frame to the 200th image frame. Thus, an overlapping section 820 that is an overlap of the first section 800 and the second section 810 includes the 51st image frame to the 149th image frame. However, this is only an example, and the correcting unit 420 may set the first section 800 and the second section 810 to include ranges of image frames other than those shown in FIG. 8.

The correcting unit 420 corrects lesions included in the 1st image frame to the 49th image frame and the 51st image frame to the 149th image frame included in the first section 800 based on the first reference image frame 830 included in the first section 800. The method of correcting the lesions is the same as the method of correcting lesions described above with respect to FIG. 7 except for the number of image frames, and thus a detailed description is omitted for conciseness.

The correcting unit 420 corrects lesions included in the 51st image frame to the image frame and the 151st image frame to the 200th image frame included in the second section 810 based on the second reference image frame 840 included in the second section 810. The method of correcting the lesions is the same as the method of corrected lesions described above with respect to FIG. 7, and thus a detailed description is omitted for conciseness.

Figure 9:
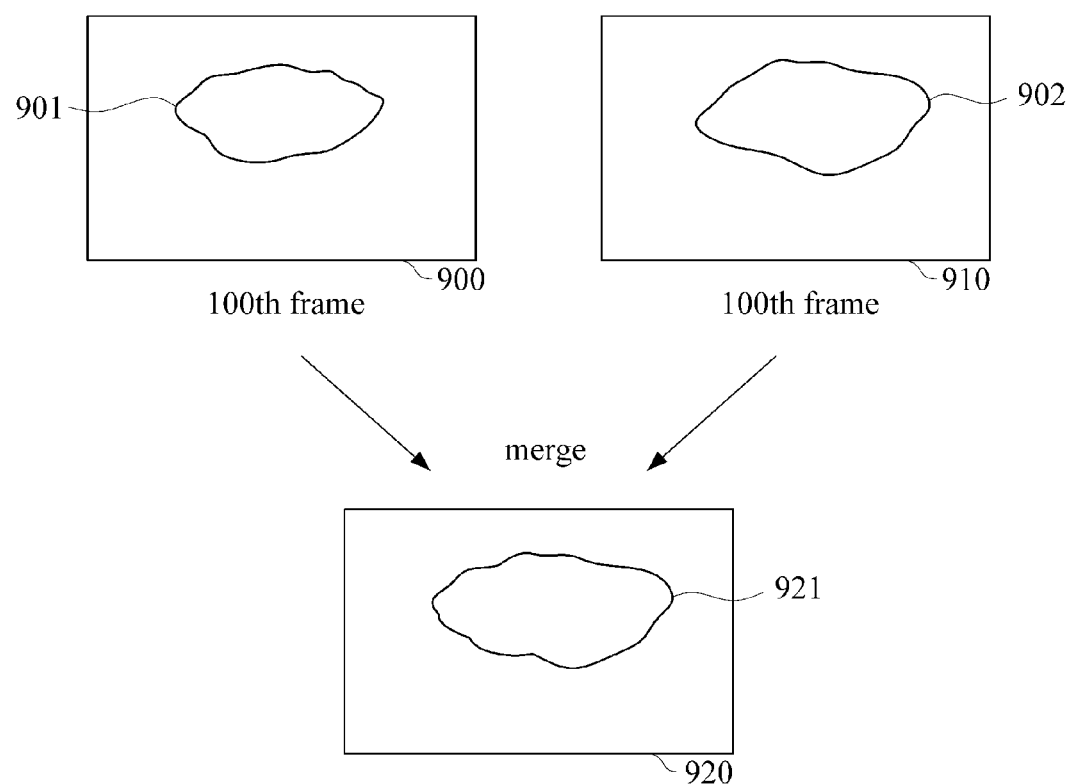
FIG. 9 is a diagram illustrating an example of corrected lesions that have been corrected by the correcting unit illustrated in FIG. 4 and are merged by the merging unit illustrated in FIG. 4.

FIG. 9 is a diagram illustrating an example of corrected lesions that have been corrected by the correcting unit 420 illustrated in FIG. 4 and are merged by the merging unit 430 illustrated in FIG. 4. Referring to FIGS. 4, 8, and 9, the merging unit 430 merges corrected lesions by merging corresponding image frames in the overlapping section wherein each of the image frames includes the corrected lesion. For example, lesions included in the 51st image frame to the 149th image frame included in the overlapping section 820 are corrected one time based on the first reference image 830, and are corrected another time based on the second reference image 840. Thus, the lesions included in the 51st image frame to the 149th image frame are corrected a total of two times.

For example, as shown in FIG. 9, a 100th image frame 900 included in the first section 800 includes a corrected lesion 901 that has been corrected based on the first reference image frame 830. Also, the 100th image frame 910 included in the second section 810 includes a corrected lesion 902 that has been corrected based on the second reference image frame 840. The merging unit 430 merges the corrected lesion 901 corrected based on the first reference image frame 830 and the corrected lesion 902 corrected based on the second reference image frame 840 to generate a 100th image frame 920 that includes a merged corrected lesion 921 into which the corrected lesions 901 and 902 have been merged. By repeating the above operation, the merging unit 430 merges the corrected lesions in each of the 50th image frame to the 150th image frame included in the first section 800 and the corrected lesions in each of the 50th image frame to the 150th image frame included in the second section 810 into corrected lesions.

The merging unit 430 may merge the corrected lesions 901 and 902 by creating a merged lesion boundary for the merged corrected lesion 921 that includes all of the area that is included in the corrected lesion 901 and all of the area that is included in the corrected lesion 902, or that includes only the area that is included in both the corrected lesion 901 and the corrected lesion 902, or that is an average of the boundary of the corrected lesion 901 and the corrected lesion 902. However, these are only examples, and various other methods may be used to merge the corrected lesions 901 and 902.

Based on at least two reference image frames, the apparatus 400 may correct the lesions included in the remaining image frames other than the reference image frames, and thus can correct the lesions included in the remaining image frames more accurately and easily.

Figure 10:
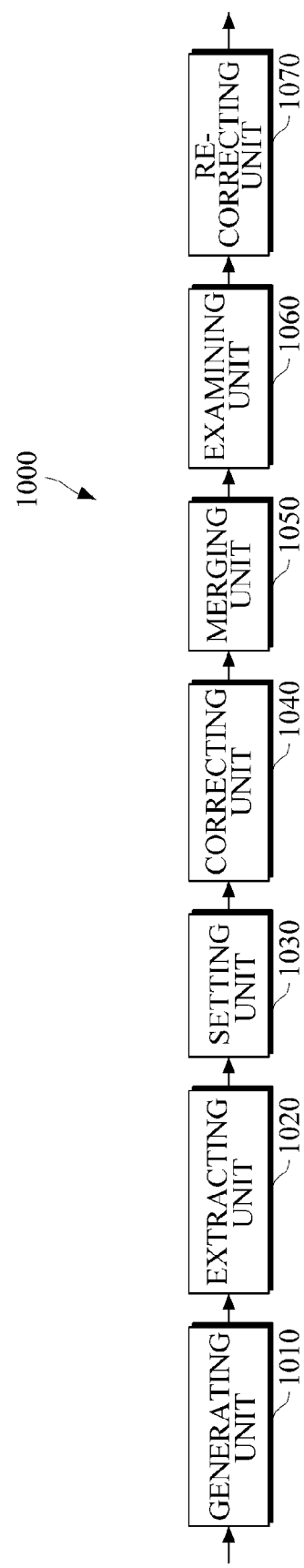
FIG. 10 is a diagram illustrating another example of an apparatus for correcting a lesion.

FIG. 10 is a diagram illustrating another example of an apparatus for correcting a lesion. Referring to FIG. 10, an apparatus 1000 for correcting a lesion includes a generating unit 1010, an extracting unit 1020, a setting unit 1030, a correcting unit 1040, a merging unit 1050, an examining unit 1060, and a re-correcting unit 1070.

The generating unit 1010 generates at least one lesion value that represents a characteristic of a lesion included in each of a plurality of 2-dimensional image frames that form a 3-dimensional image.

The extracting unit 1020 extracts at least one candidate image frame based on the lesion value generated by the generating unit 1010. The candidate image frame is a candidate for an image frame that the correcting unit 1040 uses to correct the lesion.

Operations and configurations of the generating unit 1010 and the extracting unit 1020 may be the same as those of the generating unit 110 and the extracting unit 120 illustrated in FIG. 1. Accordingly, a detailed description thereof will be omitted for conciseness.

A user may correct a lesion included in at least one candidate image frame among the candidate image frames extracted by the extracting unit 1020. For example, the user may correct a boundary of a lesion included in an image frame, or may designate a new lesion.

In response to the user correcting a lesion included in at least one candidate image frame among the candidate image frames extracted by the extracting unit 1020, the setting unit 1030 sets the at least one candidate image frame including the corrected lesion as at least one reference image frame.

The correcting unit 1040 corrects lesions included in the remaining image frames other than the reference image frame based on the corrected lesion included in the at least one reference image frame.

The merging unit 1050 merges corrected lesions in each of image frames included in an overlapping section into a merged corrected lesion.

Operations and configurations of the setting unit 1030, the correcting unit 1040, and the merging unit 1050 are the same as those of the setting unit 410, the correcting unit 420, and the merging unit 430 illustrated in FIG. 4. Therefore, a detailed description thereof will be omitted for conciseness.

The examining unit 1060 examines whether image segmentation has been normally performed by the correcting unit 1040.

For example, if a Hausdorff distance between a lesion included in an examination target image frame (i.e., an image frame that is a target of the examination) and a lesion included in an adjacent image frame is greater than a predefined value, the examining unit 1060 may determine that the image segmentation has not been normally performed on the examination target image frame by the correcting unit 1040.

As another example, if an overlapping area between a lesion included in an examination target image frame and a lesion included in an adjacent image frame is smaller than a predefined size, the examining unit 1060 may determine that the image segmentation has not been normally performed on the examination target image frame by the correcting unit 1040.

However, in addition to the above examples, the examining unit 1060 may use various other methods to determine whether the image segmentation has been normally performed by the correcting unit 1040.

In response to the determination that the image segmentation has not been performed normally by the correcting unit 1040, the re-correcting unit 1070 re-corrects a lesion included in the examination target image frame, which will be referred to as a re-correction target image frame in the re-correcting operation performed by the re-correcting unit 1070.

For example, the re-correcting unit 1070 may repeat image segmentation on the re-correction target image frame, thereby re-correcting a lesion included in the re-correction target image frame.

As another example, the re-correcting unit 1070 may correct the lesion included in the re-correction target image frame based on a characteristic of a lesion included in an image frame preceding the re-correction target image frame and a characteristic of a lesion included in an image frame following the re-correction target image frame. For example, the re-correcting unit 1070 may correct a lesion included in the re-correction target image frame to have an intermediate value of boundary values of the lesions included in the preceding image frame and the succeeding image frame. The intermediate value may be an average value or any other kind of intermediate value.

The apparatus 1000 may use some image frames in which a lesion has been corrected, among a plurality of 2-dimensional image frames that form a 3-dimensional image, as reference image frames for correcting lesions included in the remaining image frames, thereby accurately and easily correcting the lesions included in the remaining image frames.

In addition, the apparatus 1000 may examine whether the lesions included in the remaining image frames have been accurately corrected, and, if not, may re-correct the lesions, thereby more accurately correcting the lesions included in the remaining image frames using the reference image frames.

Figure 11:
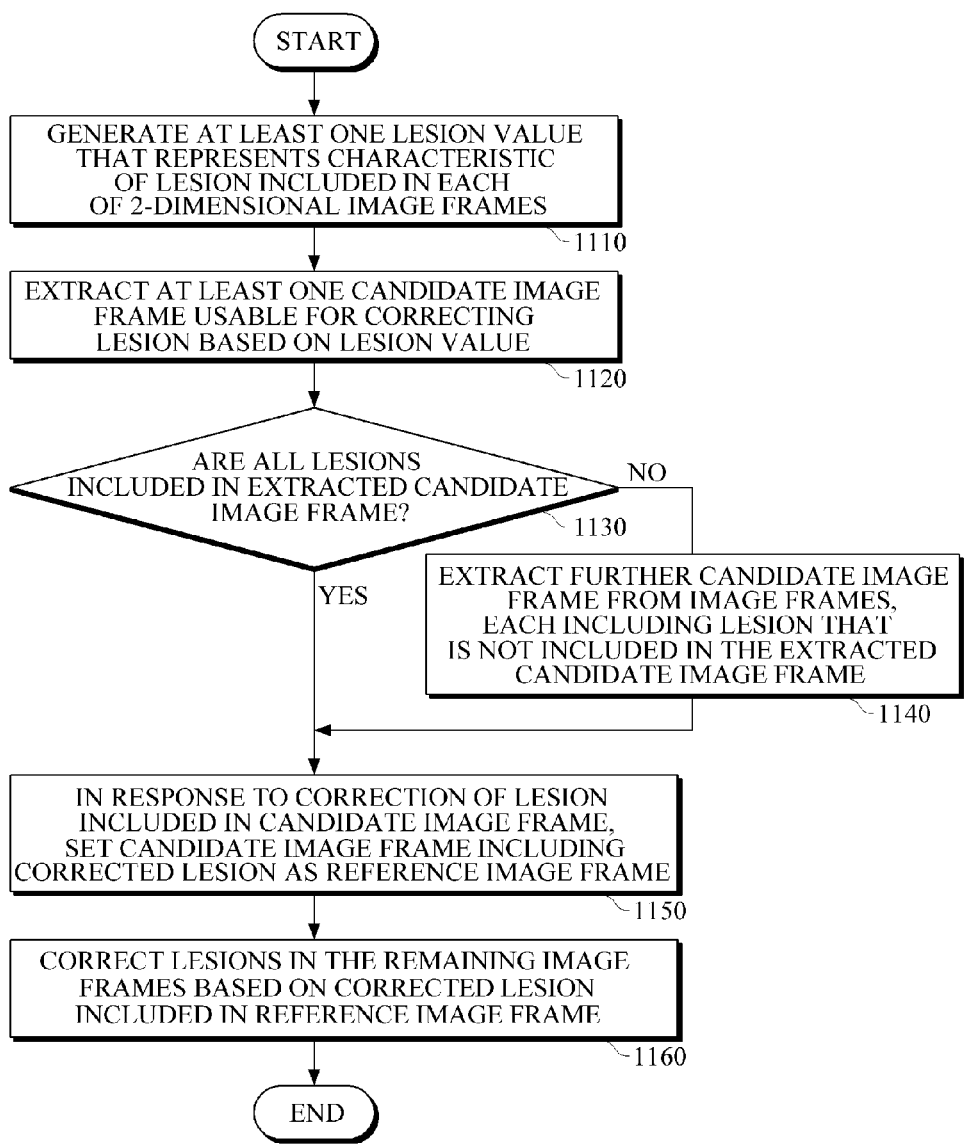
FIG. 11 is a diagram illustrating a flowchart of an example of a method of correcting a lesion in an apparatus for correcting a lesion illustrated in FIG. 10.

FIG. 11 is a diagram illustrating a flowchart of an example of a method of correcting a lesion in the apparatus 1000 for correcting a lesion illustrated in FIG. 10. Referring to FIGS. 10 and 11, the apparatus 1000 generates at least one lesion value that represents a characteristic of a lesion included in each of a plurality of 2-dimensional image frames that form a 3-dimensional image at 1110.

The apparatus 1000 extracts at least one candidate image frame usable for correcting a boundary of the lesion based on the at least one lesion value at 1120. For example, the apparatus 1000 may obtain a lesion value sum by adding the at least one lesion value together to obtain the lesion value sum, or by applying a respective weight to each of the at least one lesion value and adding the weighted at least one lesion value together to obtain the lesion value sum. The apparatus 1000 may extract the candidate image frame based on the lesion value sum.

The apparatus 1000 determines whether the extracted at least one candidate image frame includes all lesions that are included in the image frames at 1130.

In response to a determination that not all lesions are included in the extracted at least one candidate image frame, the apparatus 1000 extracts a further candidate image frame from ones of the image frames that include a lesion that is not included in the extracted at least one candidate image frame at 1140. On the other hand, in response to a determination that the extracted at least one candidate image frame includes all lesions that are included in the image frames, the apparatus 1000 stops extracting a candidate image frame.

In response to correction of a lesion included in the at least one candidate image frame, the apparatus 1000 sets the at least one candidate image frame that includes the corrected lesion as at least one reference image frame at 1150.

The apparatus 1000 corrects lesions included in the remaining image frames based on the corrected lesion included in the at least one reference image frame at 1160. For example, the apparatus 1000 may perform image segmentation on the remaining image frames based on a characteristic of the corrected lesion included in the reference image frame to correct the lesions included in the remaining image frames. More specifically, the apparatus 1000 may perform image segmentation on a first image frame of the remaining image frames that is adjacent to the reference image frame based on the characteristic of the corrected lesion included in the reference image frame to correct a lesion included in the first image frame, and perform image segmentation on a second image frame of the remaining image frames that is adjacent to the first image frame based on the characteristic of the corrected lesion in the reference image frame and/or a characteristic of the corrected lesion included in the first image to correct the lesion included in the second image frame. By repeating the above operations, all lesions included in each of the remaining image frames may be corrected.

As described above, the method may use at least one image frame in which a lesion has been corrected, among a plurality of 2-dimensional image frames that form a 3-dimensional image, as a reference image frame to correct a lesion included in each of the remaining image frames accurately and easily.

The methods and/or operations described above may be recorded, stored, or fixed in one or more non-transitory computer-readable storage medium that includes program instructions to be implemented by a computer to cause a processor to execute or perform the program instructions. The medium may also include, alone or in combination with the program instructions, data files, data structures, and the like. Examples of a non-transitory computer-readable storage medium include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network, and computer-readable codes or program instructions may be stored and executed in a decentralized manner.

In particular, the various units illustrated in FIGS. 1, 4, and 10 may be implemented using hardware components and/or software components. Software components may be implemented by a processing device, which may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement functions A, B, and C; a first processor configured to implement function A and a second processor configured to implement functions B and C; a first processor configured to implement functions A and B and a second processor configured to implement function C; a first processor to implement function A, a second processor configured to implement function B, and a third processor configured to implement function C; a first processor configured to implement functions A, B, C and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

In particular, the software and data may be stored by one or more non-transitory computer-readable storage mediums. The non-transitory computer-readable storage medium may include any data storage device that can store data that can be thereafter read by a computer system or processing device. Examples of a non-transitory computer-readable storage medium include read-only memory (ROM), random-access memory (RAM), CD-ROMs, magnetic tapes, floppy disks, and optical data storage devices. Also, functional programs, codes, and code segments for implementing the examples disclosed herein can be easily construed by programmers skilled in the art to which the examples pertain based on and using the flow diagrams and block diagrams of the figures and their corresponding descriptions as provided herein.

Several examples have been described above. Nevertheless, it should be understood that various modifications may be made in these examples. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the claims and their equivalents.

What is claimed is:

1. An apparatus for selecting a candidate image frame, the apparatus comprising:
   a processor configured to
   generate at least one lesion value that represents a characteristic of a lesion included in each of a plurality of 2-dimensional image frames that form a 3-dimensional image;
   extract, from the image frames, at least one candidate image frame usable for correcting a boundary of the lesion based on the at least one lesion value;
   wherein the processor is configured to obtain a lesion value sum by adding the generated lesion values together to obtain the lesion value sum, or by applying a respective weight to each of the at least one lesion value and adding the weighted at least one lesion value together to obtain the lesion value sum; and
   extract the at least one candidate image frame from the image frames based on the lesion value sum.

2. The apparatus of claim 1, wherein the processor is further configured to extract the at least one candidate image frame from ones of the image frames that have a local maximum of the lesion value sum.

3. The apparatus of claim 1, wherein the processor is further configured to:
   determine whether the extracted at least one candidate image frame includes all lesions that are included in the image frames; and
   extract a further candidate image frame from ones of the image frames that include a lesion that is not included in the extracted at least one candidate image frame.

4. The apparatus of claim 1, wherein the characteristic of the lesion comprises any one or any combination of a number of lesions, a lesion size, a lesion shape, a boundary surface of a lesion, a boundary line of a lesion, and position information of points at a boundary line of a lesion.

5. An apparatus for correcting a lesion, the apparatus comprising:
   a processor configured to
   set, in response to correction of a lesion included in at least one image frame among a plurality of 2-dimensional image frames that form a 3-dimensional image, the at least one image frame including the corrected lesion as at least one reference image frame; and
   correct a lesion included in each of the image frames excluding the at least one reference image frame based on the corrected lesion included in the at least one reference image frame, the image frames excluding the at least one reference image frame constituting remaining image frames of the image frames wherein the processor is configured to set, if the at least one reference image frame comprises at least two reference image frames, at least two sections with respect to the image frames so that each section of the at least two sections comprises a different reference image frame of the least two reference image frames and some of the remaining image frames; and correct the lesion included in each image frame of the remaining image frames within each section of the at least two sections based on the reference image frame included in a respective section of the at least two sections.

6. The apparatus of claim 5, wherein the processor is further configured to perform image segmentation on each of the remaining image frames based on a characteristic of the corrected lesion to correct the lesion included in each of the remaining image frames.

7. The apparatus of claim 5, wherein the processor is further configured to:

perform image segmentation on a first image frame of the remaining image frames that is adjacent to a reference image frame of the at least one reference image frame based on a characteristic of the corrected lesion in the reference image frame to correct the lesion included in the first image frame; and perform image segmentation on a second image frame of the remaining image frames that is adjacent to the first image frame based on the characteristic of the corrected lesion included in the reference image frame and/or a characteristic of the corrected lesion included in the first image frame to correct the lesion included in the second image frame.

8. The apparatus of claim 5, wherein the processor is further configured to set the at least two sections not to overlap each other so that none of the remaining image frames are included in more than one section of the at least two sections.

9. The apparatus of claim 5, wherein the processor is further configured to:

set two sections of the at least two sections to overlap each other so that at least one remaining image frame of the remaining image frames is included in an overlapping section formed by overlapping portions of the two sections; and correct the lesions in each of the at least one remaining image frame within the overlapping section based on the reference image frames included in the two sections.

10. The apparatus of claim 9, wherein the processor is further configured to merge the corrected lesions included in each of the at least one remaining image frame within the overlapping section on an image frame-by-image-frame basis.

11. An apparatus for correcting a lesion, the apparatus comprising:

a processor configured to generate at least one lesion value that represents a characteristic of a lesion included in each of a plurality of 2-dimensional image frames that form a 3-dimensional image;

extract, from the image frames, at least one candidate image frame usable for correcting a boundary of the lesion based on the at least one lesion value;

set, in response to correction of the lesion included in the at least one candidate image frame, the at least one candidate image frame including the corrected lesion as at least one reference image frame; and correct the lesion included in each of the image frames excluding the at least one reference image frame based on the corrected lesion included in the at least reference image frame, the image frames excluding the at least one reference image frame constituting remaining image frames of the image frames, wherein the processor is configured to obtain a lesion value sum by adding the generated lesion values together to obtain the lesion value sum, or by applying a respective weight to each of the at least one lesion value and adding the weighted at least one lesion value together to obtain the lesion value sum; and extract the at least one candidate image frame from the image frames based on the lesion value sum.

12. The apparatus of claim 11, wherein the processor is further configured to:

determine whether the extracted at least one image frame includes all lesions that are included in the image frames; and extract a further candidate image frame from ones of the image frames that include a lesion that is not included in the extracted at least one candidate image frame.

13. The apparatus of claim 11, wherein the processor is further configured to perform image segmentation on each of the remaining image frames based on a characteristic of the corrected lesion to correct the lesion included in each of the remaining image frames.

14. The apparatus of claim 13, wherein the processor is further configured to examine whether the image segmentation has been performed normally on each image frame of the remaining image frames; and re-correct the lesion included in an image frame of the remaining image frames when the processor determines that the image segmentation has not been performed normally on the image frame.

15. The apparatus of claim 11, wherein the processor is further configured to perform image segmentation on a first image frame of the remaining image frames that is adjacent to a reference image frame of the at least one reference image frame based on a characteristic of the corrected lesion in the reference image frame to correct the lesion included in the first image frame; and perform image segmentation on a second image frame of the remaining image frames that is adjacent to the first image frame based on the characteristic of the corrected lesion included in the reference image frame and/or a characteristic of the corrected lesion included in the first image frame to correct the lesion included in the second image frame.

16. The apparatus of claim 11, wherein the processor is further configured to set, if the at least one reference image frame comprises at least two reference image frames, at least two sections with respect to the image frames so that each section of the at least two sections comprises a different reference image frame of the at least two reference image frames and some of the remaining image frames; and correct the lesions in the remaining image frames within each section of the at least two sections based on the reference image frame included in a respective section of the at least two sections.

17. A method of selecting a candidate image frame, the method comprising:
- generating at least one lesion value that represents a characteristic of a lesion included in each of a plurality of 2-dimensional image frames that form a 3-dimensional image;
- extracting, from the image frames, at least one candidate image frame usable for correcting a boundary of the lesion based on the at least one lesion value;
- wherein the extracting of the at least one candidate image frame comprises
- obtaining a lesion value sum by adding the generated lesion values together to obtain the lesion value sum, or by applying a respective weight to each of the at least one lesion value and adding the weighted at least one lesion value together to obtain the lesion value; and
- extracting the at least one candidate image frame from the image frames based on the lesion value sum.

18. The method of claim 17, wherein the extracting of the at least one candidate image frame further comprises extracting the at least one candidate image frame from ones of the image frames that have a local maximum of the lesion value sum.

19. The method of claim 17, wherein the extracting of the at least one candidate image frame comprises:
- determining whether the extracted at least one candidate image frame includes all lesions that are included in the image frames; and
- extracting a further candidate image frame from ones of the image frames that include a lesion that is not included in the extracted at least one candidate image frame.

20. The method of claim 17, wherein the characteristic of the lesion comprises any one or any combination of a number of lesions, a lesion size, a lesion shape, a boundary surface of a lesion, a boundary line of a lesion, and position information of points at a boundary line of a lesion.

21. A method of correcting a lesion, the method comprising:
- setting, in response to correction of a lesion included in at least one image frame among a plurality of 2-dimensional image frames that form a 3-dimensional image, the at least one image frame including the corrected lesion as at least one reference image frame; and
- correcting a lesion included in each of the image frames excluding the at least one reference image frame based on the corrected lesion included in the at least one reference image frame, the image frames excluding the at least one reference image frame constituting remaining image frames of the image frames,
- wherein the correcting of the lesion comprises
- setting, if the at least one reference image frame comprises at least two reference image frames, at least two sections with respect to the image frames so that each section of the at least two sections comprises a different reference image frame of the at least two reference image frames and some of the remaining image frames; and
- correcting the lesion included in each image frame of the remaining image frames within each section of the at least two sections based on the reference image frame included in a respective section of the at least two sections.

22. The method of claim 21, wherein the correcting of the lesion comprises performing image segmentation on each of the remaining image frames based on a characteristic of the corrected lesion to correct the lesion included in each of the remaining image frames.

23. The method of claim 21, wherein the correcting of the lesion comprises:
- performing image segmentation on a first image frame of the remaining image frames that is adjacent to a reference image frame of the at least one reference image frame based on a characteristic of the corrected lesion in the reference image frame to correct the lesion included in the first image frame; and
- performing image segmentation on a second image frame of the remaining image frames that is adjacent to the first image frame based on the characteristic of the corrected lesion included in the reference image frame and/or a characteristic of the corrected lesion in the first image frame to correct the lesion included in the second image frame.

24. The method of claim 21, wherein the correcting of the lesion further comprises setting the at least two sections not to overlap each other so that none of the remaining image frames are included in more than one section of the at least two sections.

25. The method of claim 21, wherein the correcting of the lesion further comprises:
- setting two sections of the at least two sections to overlap each other so that least one remaining image frame of the remaining image frames is included in an overlapping section formed by overlapping portions of the two sections; and
- correcting the lesions in each of the at least one remaining image frame within the overlapping section based on the reference image frames included in the two sections.

26. The method of claim 25, further comprising merging the corrected lesions included in each of the at least one remaining image frame within the overlapping section on an image frame-by-image frame basis.

27. A method of correcting a boundary of a lesion, the method comprising:
- generating at least one lesion value that represents a characteristic of a lesion included in each of a plurality of 2-dimensional image frames that form a 3-dimensional image;
- extracting, from the image frames, at least one candidate image frame usable for correcting a boundary of the lesion based on the at least one lesion value;
- setting, in response to correction of the lesion included in the at least one candidate image frame, the at least one candidate image frame including the corrected lesion as at least one reference image frame; and
- correcting the lesion included in each of the image frames excluding the at least one reference image frame based on the corrected lesion included in the at least one reference image frame, the image frames excluding the at least one reference image frame constituting remaining image frames of the image frames,
- wherein the extracting of the at least one candidate image frame comprises
- obtaining a lesion value sum by adding the generated lesion values together to obtain the lesion value sum, or by applying a respective weight to each of the at least one lesion value and adding the weighted at least one lesion value together to obtain the lesion value sum; and
- extracting the at least one candidate image frame from the image frames based on the lesion value sum.

28. The method of claim 27, wherein the extracting of the at least one candidate image frame comprises:
- determining whether the extracted at least one image frame includes all lesions that are included in the image frames; and extracting a further candidate image frame from ones of the image frames that include a lesion that is not included in the extracted at least one candidate image frame.

29. The method of claim 27, wherein the correcting of the lesion comprises performing image segmentation on each of the remaining image frames based on a characteristic of the corrected lesion to correct the lesion included in the remaining image frames.

30. The method of claim 29, further comprising:
   examining whether the image segmentation has been performed normally on each image frame of the remaining image frames; and
   re-correcting the lesion included in an image frame of the remaining image frames when a result of the examining is that the image segmentation has not been performed normally on the image frame.

31. The method of claim 27, wherein the correcting of the lesion comprises:
   performing image segmentation on a first image frame of the remaining image frames that is adjacent to a reference image frame of the at least one reference image frame based on a characteristic of the corrected lesion in the reference image frame to correct the lesion included in the first image frame; and
   performing image segmentation on a second image frame of the remaining image frames that is adjacent to the first image frame based on the characteristic of the corrected lesion included in the reference image frame and/or a characteristic of the corrected lesion included in the first image frame to correct the lesion included in the second image frame.

32. The method of claim 27, wherein the correcting of the lesion comprises:
   setting, if the at least one reference image frame comprises at least two reference image frames, at least two sections with respect to the image frames so that each section of the at least two sections comprises a different reference image frame of the at least two reference image frames and some of the remaining image frames; and
   correcting the lesions in the remaining image frames within each of the at least two sections based on the reference image frame included in a respective section of the at least two sections.

* * * * *